United States Patent [19]
Perlman et al.

[11] 3,831,249
[45] Aug. 27, 1974

[54] APPARATUS FOR ASSEMBLING ROLLER BEARING REMOTE CONTROL CABLES

[75] Inventors: Sheldon E. Perlman, Wyncote; John C. Ion, Doylestown, both of Pa.

[73] Assignee: Teleflex Incorporated, North Wales, Pa.

[22] Filed: Apr. 5, 1973

[21] Appl. No.: 348,411

[52] U.S. Cl............................................. 29/201 R
[51] Int. Cl............................................. B23p 19/04
[58] Field of Search........... 29/201, 148.4 A, 201 D, 29/148.4 R, 148.4 B

[56] References Cited
UNITED STATES PATENTS
3,533,151 10/1970 Gaudry............................ 29/201 R
3,552,600 1/1971 Hoffman........................ 29/201 R X

*Primary Examiner*—Thomas H. Eager
*Attorney, Agent, or Firm*—McGlynn and Milton

[57] ABSTRACT

An apparatus is provided for assembling the components of a roller bearing remote control cable. Three confluent passages of the apparatus are fed, respectively, a first outer bearing race overlaid by a first elongated ball separator strip, a center core overlaid by a second elongated ball separator strip, and a second outer bearing race. First and second gravity feed ball bearing hoppers having converging wall portions provide a line of ball bearings respectively aligned with each of the passages carrying an elongated ball separator strip. As the elongated ball separator strips pass these lines of ball bearings, balls load the elongated ball separator strips. The first outer bearing race, the first elongated ball separator strip loaded with balls, the center core, the second elongated ball separator strip loaded with balls, and the second outer bearing race pass through a common passageway to a pair of wheels which frictionally engage the assembled components for alignment with and insertion into an outer sheath thereby completing the assembly of the roller bearing remote control cable.

12 Claims, 7 Drawing Figures

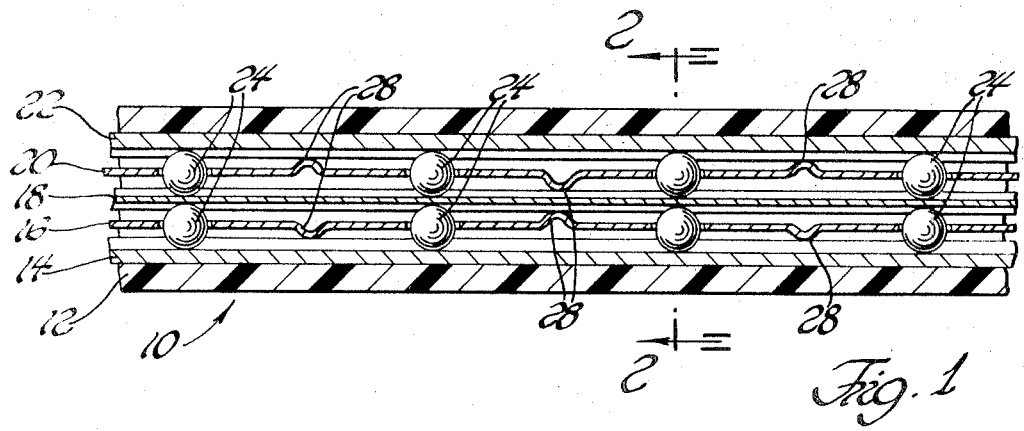
Fig. 1
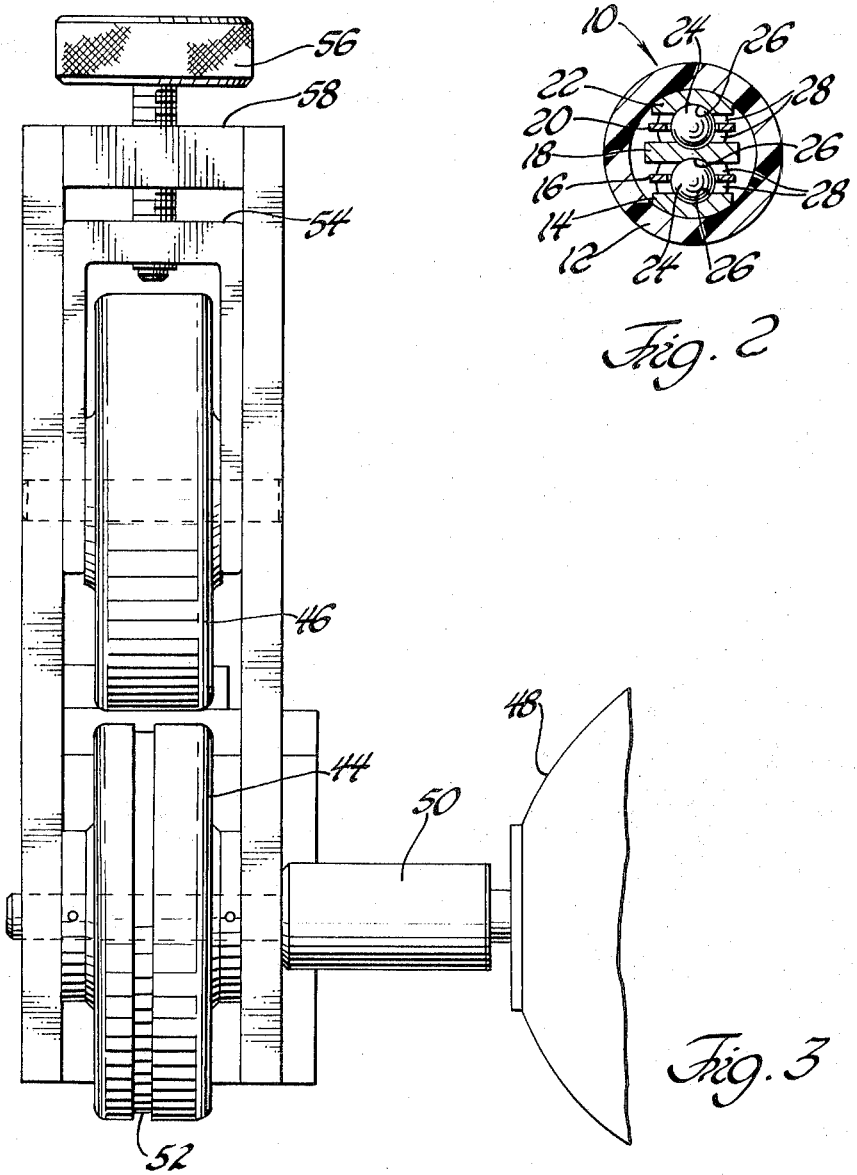
Fig. 2
Fig. 3

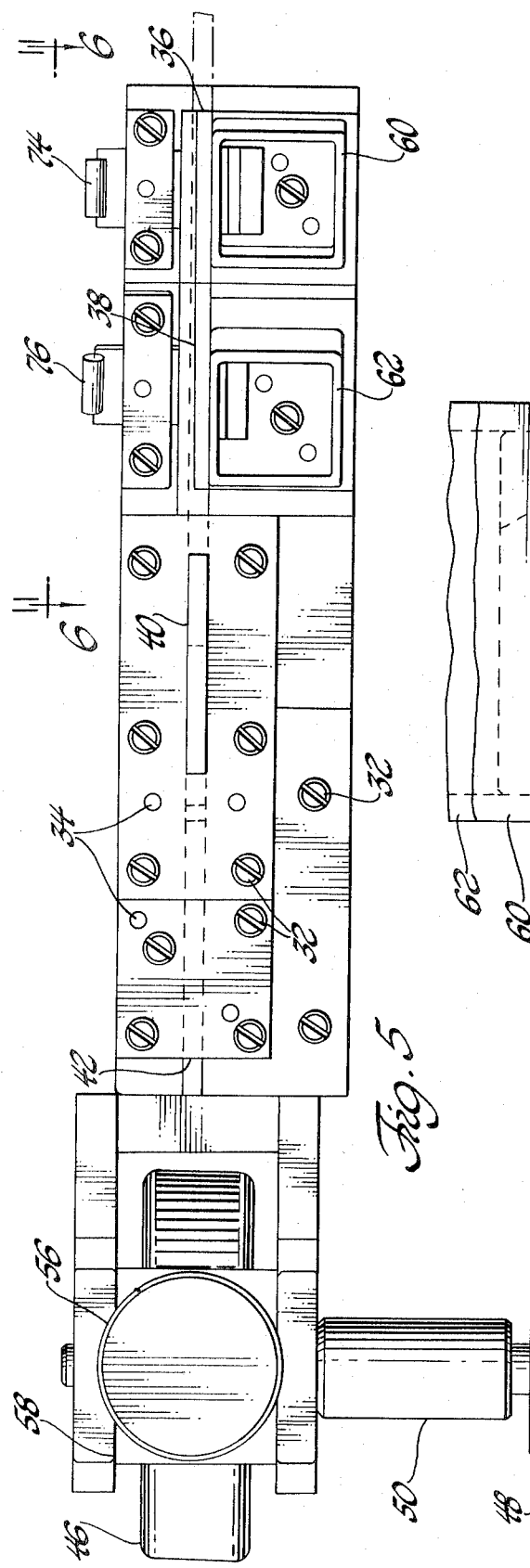

APPARATUS FOR ASSEMBLING ROLLER BEARING REMOTE CONTROL CABLES

This invention relates to an apparatus for assembling the components of a roller bearing remote control cable.

Push-pull motion transmitting control cables are useful to transmit motion to remote or inaccessible locations; they are also useful if it is desired to provide a centralized control point from which regulation or control at a plurality of separated controlled points is achieved. Conventional push-pull motion transmitting remote control cables are frequently unsatisfactory if the separation between the control point and the controlled point is great, or if the interconnecting path between these points requires sharp turns or bends for the cable. In these latter situations roller bearing remote control cables are preferred.

The assembly of a roller bearing remote control cable is considerably more difficult than the assembly of conventional push-pull motion transmitting control cables. The fabrication difficulties arise from the need to load the control cable with ball bearings and to retain the ball bearings in position in anticipation of final assembly. In this regard it is notable that it is quite important that a ball bearing be loaded in each ball bearing position of the roller bearing remote control cable to ensure proper operation of that cable. Accordingly, it is imperative that a properly aligned ball be available to fill each ball position of the roller bearing remote control cable during assembly. If the balls jam in the ball loading apparatus, or if a ball position of the roller bearing remote control cable is not filled with a ball, downtime is required in the manufacturing process to correct the malfunction. These maintenance and reliability difficulties attendant the production of roller bearing remote control cables have not been satisfactorily solved in the prior art.

The apparatus of the instant invention obviates ball jam-ups and unfilled ball positions in the assembled roller bearing remote control cable. First, the apparatus uses gravity feed ball bearing hoppers provided with converging wall portions to align several ball bearings for assembly in the roller bearing remote control cable being fabricated. The dimensions and tolerances of these gravity feed ball bearing hoppers, and the concept of a line of several ball bearings for assembly, preclude ball bearing jam-ups in the apparatus thereby increasing reliability and reducing maintenance requirements. Second, the line of ball bearings available from these gravity feed hoppers are disposed in alignment with the ball separator strips to load those strips during assembly operations. In this loading technique, each ball bearing position in the separator strip passes several aligned balls to ensure that each ball position is filled before the position passes the last ball in the line. For example, the position might not receive the first ball in the line, but this does not result in an unfilled position since the position can be filled by any of several subsequent balls in the line. As with the gravity feed concepts of the present invention, the availability of a plurality of aligned balls to fill ball positions during assembly of the roller bearing remote control cable increases the reliability and decreases the maintenance requirements of the apparatus of the present invention.

In the subject apparatus, three confluent passages are fed, respectively, a first outer bearing race overlaid by a first elongated ball separator strip, a center core overlaid by a second elongated ball separator strip, and a second outer bearing race. Ball bearings from two gravity feed ball bearing hoppers are aligned with each of the passages carrying an elongated ball separator strip, and these ball bearings load the elongated ball separator strips as the strips pass the lines of balls. The first outer bearing race, the first elongated ball separator strip loaded with balls, the center core, the second elongated ball separator strip loaded with balls, and the second outer bearing race pass through a common passageway to a pair of wheels which frictionally engage the assembled components for alignment with and insertion into an outer sheath to complete the assembly of the roller bearing remote control cable.

Additional features and advantages of the present invention will be apparent from the following description, taken in connection with the accompanying drawings, in which:

FIG. 1 is a partial sectional view of a roller bearing remote control cable illustrating the radial relationships between the various components of the cable;

FIG. 2 is an axial sectional view of the roller bearing remote control cable of FIG. 1 taken along line 2—2;

FIG. 3 is an end view of the apparatus of the present invention;

FIG. 5 is a top view of the apparatus of the present invention;

FIG. 6 is a partial sectional view of the apparatus of the present invention taken along line 6—6 of FIG. 5; and FIG. 7 is an enlarged partial sectional end view of the apparatus of the present invention taken at the end of the apparatus opposite the end shown in FIG. 3.

Figure 4:
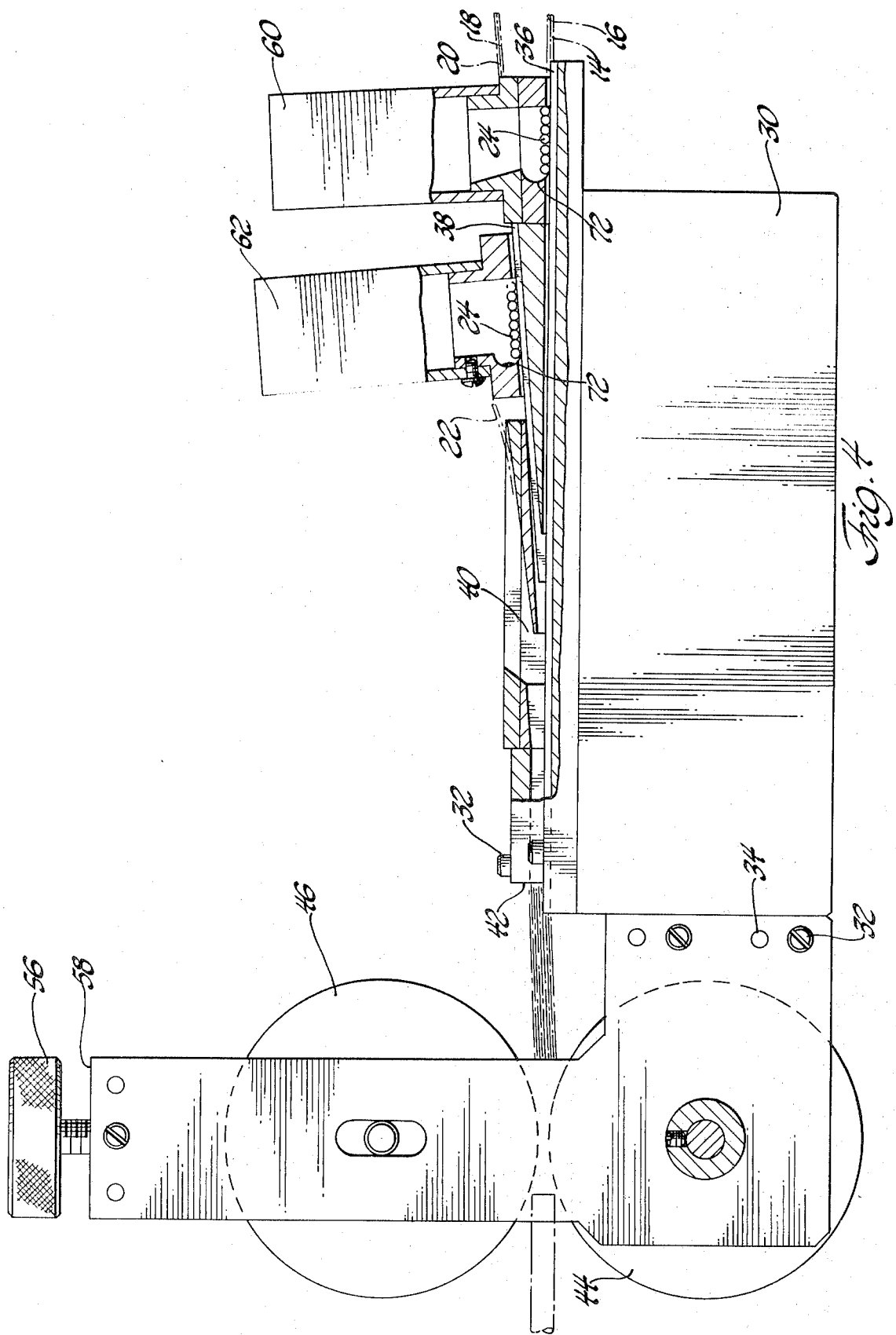
FIG. 4 is a partial sectional side view of the apparatus of the present invention.

Reference should now be made to the drawings, and more particularly to the sectional views of FIGS. 1 and 2 showing a roller bearing remote control cable generally designated 10 of a type assembled by the apparatus of the present invention. The cable 10 includes an outer sheath 12, a first outer bearing race 14, a first elongated ball separator strip 16, a motion transmitting member or center core 18, a second elongated ball separator strip 20, a second outer bearing race 22, and a plurality of balls 24 loaded in the elongated ball separator strips 16 and 20. The outer bearing races 14 and 22 and the center core 18 are provided with grooves or troughs 26 slidably engaging the balls 24 as best illustrated in FIG. 2. The elongated ball separator strips include a plurality of integral spacers 28 to position these ball separators substantially midway between the outer bearing races 14 and 22 and the center core 18 as illustrated.

FIGS. 3–7 are various views of the apparatus of the present invention which, as noted above, is used for assembling roller bearing remote control cables including those of the type illustrated in FIGS. 1 and 2. The apparatus includes a base 30 to which various elements of the apparatus are mounted by mounting screws 32 after alignment with alignment pins 34. The elements of the apparatus define a passage 36 adapted to pass an elongated ball separator strip overlaying an outer bearing race, for example the elongated ball separator strip 16 overlaying the outer bearing race 14 as illustrated in FIGS. 1 and 2. A similar second passage 38 defined by the elements of the apparatus is adapted to pass a second elongated ball separator strip overlaying a center core member, for example the elongated ball separator strip 20 overlaying the center core member 18 as illustrated in FIGS. 1 and 2. A third passage 40 of the apparatus is adapted to receive a second outer bearing race, for example the outer bearing race 22 of FIGS. 1 and 2. The outer bearing race 14, the elongated ball separator strip 16, the center core 18, the elongated ball separator strip 20, and the outer bearing race 22 are all illustrated in phantom line in their respective passages in the side view of the apparatus shown in FIG. 4. The passage 36, the passage 38, and the passage 40 are confluent passages communicating with a passageway 42 adapted to receive the assembled components of the roller bearing remote control cable comprising, for example, the first outer bearing race 14, the first elongated ball separator strip 16 loaded with balls 24, the center core 18, the second elongated ball separator strip 20 loaded with balls 24, and the second outer bearing race 22.

The assembled components of the control cable are automatically fed through the apparatus by a means comprising a first wheel 44 and a second wheel 46 adapted to frictionally engage the assembled components. A conventional electric motor 48 is drivingly engaged with the wheel 44 through a coupling member 50. The wheels 44 and 46 function as a means for aligning assembled components of the roller bearing remote control cable with an outer sheath, for example the outer sheath 12 of FIG. 1 and 2. This alignment is effected by the groove 52 in the circumference of the wheel 44. The wheel 46 is carried in a yoke 54 adjustable by rotation of a knurled knob 56 engaging the yoke 54 and threadedly engaging a frame member 58. Adjustments in the position of the wheel 46 are effective to regulate the friction pressure applied to the assembled components of the control cable by the wheels 44 and 46. When the outer sheath of the control cable is held in position by clamping or otherwise, the wheels 44 and 46 can insert the assembled components of the control cable into that outer sheath as the wheels 44 and 46 rotate.

During the process of assembling a roller bearing remote control cable, balls are loaded in the elongated ball separator strips of that cable as those strips are fed through the passages 36 and 38. A hopper 60 supplies balls for loading in the ball separator passing through the passage 36. This hopper provides a plurality of aligned balls confronting and in alignment with the passage 28 as illustrated in phantom lines in FIG. 4. Similarly, a second hopper 62 provides balls for the elongated ball separator strip passing through the passage 38. The hopper 62 is operative to provide a plurality of aligned balls confronting and in alignment with the passage 38 as illustrated in phantom line in FIG. 4. The hoppers 60 and 62 are gravity feed hoppers provided with converging wall portions to align the balls with the passages 36 and 38; these converging wall portions of the hoppers 60 and 62 form chutes through which balls are fed to the passages for loading in ball separator strips passing therethrough. Converging wall portions 64 and 66, shown in FIG. 7 define the chute of hopper 60, and converging wall portions 68 and 70 define the chute of hopper 62. The dimensions of the bottoms of the respective chutes are such that a single line of several balls is disposed adjacent both the passage 36 and the passage 38; as illustrated in FIG. 5, the passages 36 and 38 pass alongside the hoppers 60 and 62. Each chute has a curved portion 72 illustrated in FIG. 4, to permit the balls to roll up the end of the chute as the elongated ball separator strips are fed through the respective passages.

As illustrated in FIGS. 5, 6, and 7, the hoppers 60 and 62 are displaced from one another in the direction of feed of the roller bearing remote control cable components through the apparatus. Additionally, the hopper 62 is vertically raised from the hopper 60 as shown in FIG. 6. A sliding closure means 74 is provided such that the hopper 60 can be closed to prevent balls from passing from that hopper to the passage 36. A similar closure means 76 is effective to close the hopper 62 by closing the bottom of the chute supplying balls from the hopper 62 to the passage 38. The closure means 74 and 76 are laterally slidable to open and close, respectively, the hoppers 60 and 62, and each closure means is manually operable by the operator of the apparatus when it is desirable to close the associated hopper.

Although the foregoing has proceeded in terms of a particular preferred embodiment, it is to be understood that various changes and modifications could be engrafted thereon by one skilled in the art within the spirit and scope of the appended claims.

The embodiments of the invention in which an exclusive property or privilege is claimed are defined as follows:

1. Apparatus for loading balls in a roller bearing remote control cable comprising a passage adapted to pass an elongated ball separator strip and a hopper disposed adjacent said passage adapted to receive balls and provide a plurality of aligned balls confronting and in alignment with said passage, said passage being adapted to receive an outer bearing race in addition to said elongated ball separator strip.

2. An apparatus as in claim 1, including a second passage adapted to pass a second elongated ball separator strip and a second hopper disposed adjacent said second passage and adapted to receive balls and provide a plurality of aligned balls confronting and in alignment with said second passage.

3. An apparatus as in claim 2, wherein said second passage is adapted to receive a center core member of said roller bearing remote control cable in addition to said second elongated ball retainer strip.

4. An apparatus as in claim 3, including a third passage adapted to receive a second outer bearing race.

5. An apparatus as in claim 4, wherein said first, second, and third passages are confluent passages communicating with a passageway adapted to receive the assembled components of said roller bearing remote control cable comprising the first outer bearing race, the first elongated ball separator strip loaded with balls, the center core, the second elongated ball separator strip loaded with balls, and the second outer bearing race.

6. An apparatus as in claim 5, including means for automatically feeding the assembled components of said roller bearing remote control cable through the apparatus for assembly.

7. An apparatus as in claim 6, wherein said last named means comprises first and second wheels adapted to frictionally engage the assembled components of said roller bearing remote control cable and a motor drivingly engaged with one of said wheels.

8. An appatatus as in claim 7, including means for aligning the assembled components of said roller bearing remote control cable with an outer sheath of said roller bearing remote control cable whereby said assembled components can be assembled therewith.

9. An appatatus as in claim 8, wherein said first hopper and said second hopper each includes converging wall portions whereby said balls are aligned in response to gravity forces and a sliding closure means whereby said first hopper and said second hopper can be closed to prevent balls from passing, respectively, from said first hopper or said second hopper to said first passage or said second passage.

10. Apparatus for loading balls in a roller bearing remote control cable comprising a passage adapted to pass an elongated ball separator strip and a gravity feed hopper disposed adjacent said passage and adapted to receive balls, said gravity feed hopper being adapted to provide a plurality of aligned balls confronting and in alignment with said passage, a second passage adapted to pass a second elongated ball separator strip, and a second gravity feed hopper disposed adjacent said second passage and adapted to receive balls.

11. An apparatus as in claim 10, wherein said second gravity feed hopper is adapted to provide a plurality of aligned balls confronting and in alignment with said second passage.

12. An apparatus as in claim 11, including a third passage confluent with said first and second passages communicating with a passageway adapted to receive the assembled components of said roller bearing remote control cable comprising a first outer bearing race, the first elongated ball separator strip loaded with balls, the center core, the second elongated ball separator strip loaded with balls, and a second outer bearing race.

* * * * *